United States Patent Office 3,419,627
Patented Dec. 31, 1968

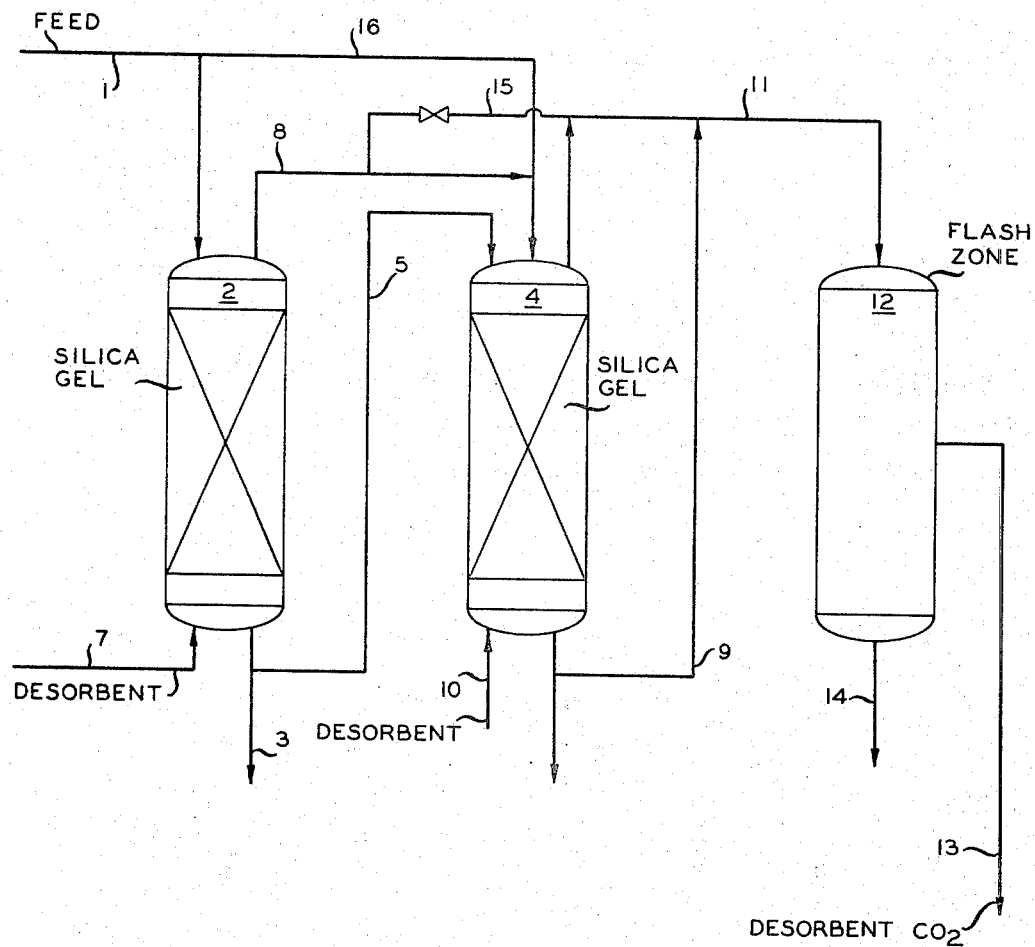

3,419,627
SEPARATION USING SILICA GEL
Hugh E. Keeling and Donald C. Tabler, Bartlesville, Okla., assignors to Phillips Petroleum Company, a corporation of Delaware
Filed Dec. 8, 1964, Ser. No. 416,835
2 Claims. (Cl. 260—652)

ABSTRACT OF THE DISCLOSURE

Monohalogen-substituted aliphatic hydrocarbons and polyhalogen-substituted aliphatic hydrocarbons are separated from each other and from unhalogenated hydrocarbons by selective adsorption on silica gel.

This invention relates to the separation of materials.

In one of its aspects, this invention relates to the separation of halogenated paraffins from n-paraffins by utilizing adsorption materials, e.g., silica gel and subsequently desorbing the halogenated paraffins therefrom utilizing carbon dioxide. In still another of its aspects this invention relates to the separation of polyhalogenated paraffins from monohalogenated paraffins by utilizing silica gel. Further, an aspect of this invention is the regeneration of spent adsorption materials by desorbing halogen-substituted aliphatics with carbon dioxide.

Chemical processes such as alkylation and hydrolysis utilize halogenated paraffins as intermediates. The paraffins are halogenated by various known methods. Several of the processes which use halogenated paraffins can operate more efficiently if the halogenated paraffins are separated from paraffinic hydrocarbons prior to their use. Similarly, separation of monohalogenated hydrocarbons and polyhalogenated hydrocarbons improves the efficiencies of the processes which require the use of one or the other. An example of one such process is the production of detergent alkylate wherein an aromatic such as benzene is alkylated with monochloroalkanes. In this particular process it has been found that the polychlorides cause formation of heavy byproducts which rapidly reduce the life of the aluminum chloride alkylation catalyst. Cyclic hydrocarbons are also produced from the polychlorides, and these undesired products co-distill with the desired alkylate. Because of the adverse effects of the polychloroalkanes in this process, the n-paraffins are chlorinated at low conversion levels to reduce the formation of the polychloroalkanes. If the chlorides are not separated from the paraffins prior to the alkylation step, the problem of recycling large amounts of unchlorinated paraffins is present. It is extremely difficult and expensive to separate mixtures of halogenated paraffins from n-paraffins when their boiling points do not differ greatly.

We have now discovered a method whereby polyhalogenated hydrocarbons and monohalogenated hydrocarbons can be separated from one another and wherein halogenated paraffins can be separated from n-paraffins.

It is an object of this invention to provide an efficient and economical method for separating monohalogenated hydrocarbons from polyhalogenated hydrocarbons.

It is a further object of this invention to provide an efficient and economical method for the separation of halogenated paraffins from n-paraffins.

Still further, an object of this invention is to provide an economical and efficient method for reactivating and re-using the separating materials of this invention.

This invention further has, as one of its objects, the preparation of materials for use in alkylation processes.

Other aspects, objects, and the several advantages of this invention are apparent from a study of this disclosure, the drawing and the appended claims.

In accordance with the practice of this invention, halogen-containing compounds are separated from other compounds utilizing an adsorbent such as silica gel which is subsequently desorbed by carbon dioxide contact.

Also, in accordance with the practice of this invention, polyhalogen-substituted aliphatics can be separated from mono-substituted aliphatics by contacting a mixture or a fluid stream containing both with a bed of silica gel. Following the adsorption of the polyhalogen-substituted aliphatics in the silica gel bed, the bed can be desorbed by contacting the bed with carbon dioxide. The polyhalogen-substituted aliphatic compounds which have been adsorbed by the silica gel bed can then be separated from the carbon dioxide desorbent stream by any suitable separation method. A separation method which has been found to be particularly useful in the practice of this invention will be hereinafter described.

The silica gel which can be used in the practice of this invention can have a mesh size of 10 to 270, but preferably, silica gel having a mesh size in the range of 50 to 150 is used. Depending upon the composition of the feedstream used and the number of silica gel beds used, the mesh size of the individual silica gel beds can be the same or substantially different.

Although the method of this invention can be used to separate various poly- and monohalogen-substituted aliphatic compounds, the invention has been found particularly useful for separating monochloroparaffins in the $C_{10}$–$C_{13}$ range, and polychloroparaffins in the $C_9$–$C_{14}$ range from n-paraffins. The invention has also been found to be particularly useful in separating polychlorides in the $C_9$–$C_{14}$ range from monochlorides.

As heretofore mentioned, carbon dioxide has been found to be particularly useful in desorbing halogen-substituted aliphatic compounds from the silica gel beds. When this is done, the carbon dioxide is preferably in liquid form and is contacted with the spent bed of silica gel at an increased pressure. Pressures in the range of 500 to 5000 p.s.i.g. can be used with the preferred pressures being in the range of 700 to 1500 p.s.i.g. A suitable contacting temperature is from 25 to 150° F. with a preferred contacting temperature being in the range from 50 to 100. Following the desorption of the halogen-substituted aliphatic from the silica gel by carbon dioxide, the carbon dioxide can be desorbed by flashing or pressure reduction. The ease of separation by this pressure reduction is, inter alia, one of the reasons why the use of carbon dioxide is highly desirable.

The invention will be more fully explained and understood by referring to the accompanying drawing. It will be understood that the drawing is diagrammatic in feature and is included for illustrative purposes only. Conventional apparatus such as pumps, heat exchangers, and control instruments, etc., have, for the most part, been omitted for the sake of simplicity. The use of such equipment, however, is within the scope of the invention.

Referring now to the drawing, a feed containing halogen-substituted aliphatics is introduced through conduit 1 to silica gel bed zone 2, wherein the halogen-substituted aliphatics are removed from the feedstream. The feedstream which has had halogen-substituted aliphatic removed from it is drawn off from conduit 3. If the feed contains n-paraffins and both mono- and polyhalogenated aliphatics, the latter can be adsorbed in zone 2 and the effluent therefrom passed via line 5 to zone 4 for adsorption of the monohalogenated compounds from n-paraffins. In another method, both mono- and polyhalogenated compounds may be adsorbed in zone 2 and the mixture recovered by contacting the silica gel with liquid carbon dioxide. The halogenated compounds are recovered from carbon dioxide by flashing and then passed to zone 4 wherein the polyhalogenated compounds are selectively adsorbed from the monohalogenated compounds. During the adsorption of halogen-substituted aliphatics in silica bed zone 2, the feedstream can be monitored by suitable analytical means known to those skilled in the art to determine the relative presence or absence of the halogen-substituted aliphatics. When it is determined by such means that the silica gel bed zone is no longer adsorbing the halogen-containing compounds from the feedstream, the feed can be discontinued and the silica bed zone 2 can be desorbed.

Desorbent is introduced to silica gel bed zone 2 through conduit 7 and removed from silica gel bed zone 2 via conduit 8. Where both polyhalogen-substituted aliphatics and monohalogen-substituted aliphatics have been removed in silica gel bed zone 2 as has hereinbefore been described, the desorbed halogen compounds can be introduced to the second silica gel bed zone 4 where the polyhalogen-substituted aliphatics can be selectively adsorbed and separated from monohalogen-substituted aliphatics. In this case, the monohalogen-substituted aliphatics can be withdrawn from silica gel bed zone 4 via conduit 9. The polyhalogen-substituted aliphatics which have been adsorbed in silica gel bed zone 4 can be desorbed by introducing a desorbent through conduit 10. The desorbent and the desorbed polyhalogen-substituted aliphatic compound are then removed via conduit 11 and the halogen compound is separated from the desorbent in flash zone 12. The separated desorbent is removed from flash zone 12 via conduit 13 where it can be further treated and recycled by any suitable means to be used again in the process. The separated halogen-substituted compound can be removed from the flash zone via conduit 14.

Following the adsorption step, it is sometimes desirable to flush the residual feedstock from the column before starting the desorption step. This is accomplished by passing a hydrocarbon such as pentane through the column. The residual pentane may then be flushed with a gas such as nitrogen. The chlorides may then be desorbed with liquid carbon dioxide without contamination.

If additional separation of the halogen-substituted compounds in the feedstream is not desired, the desorbent introduced to silica gel bed zone 2 can be transferred directly to flash zone 12 via conduit 15 where the desorbent and the halogen-substituted aliphatic compounds can be separated without further separation of the halogen-substituted aliphatic compounds.

When analysis indicates that the silica gel bed zone 2 is spent, the feedstream 1 can be diverted through conduit 16 to the second silica gel bed zone 4. Although two silica gel bed zones 2 and 4 have been shown, it will be readily apparent to one skilled in the art that a number of silica gel bed zones could be used to continuously adsorb halogen-substituted aliphatic compounds from a feedstream while spent sieves were being desorbed.

The process of this invention can be operated either as a batch or as a continuous process. The following specific examples are illustrative of a batch operation.

EXAMPLE I

A feed containing essentially all chlorides was obtained by $SO_2$ extraction and introduced to silica gel bed zone 2 through feed conduit 1. The silica gel bed zone comprised 203.8 grams of silica gel having a mesh size ranging from 60 to 100.

A typical analysis of the feedstream is indicated in Table I.

TABLE I.—TYPICAL CHLORINATION FEED

| | Weight percent | Mol percent |
|---|---|---|
| $C_9$ | 0 | 0 |
| $C_{10}$ | 6.1 | 7.1 |
| $C_{11}$ | 41.1 | 43.5 |
| $C_{12}$ | 32.2 | 31.3 |
| $C_{13}$ | 20.4 | 18.2 |
| $C_{14}$ | 0 | 0 |

By C–H analysis of the feedstream, the average molecular formula of the feed was determined to be $C_{11.6}H_{24.2}Cl_{1\ or\ 2}$. The weight percent chloride in the feedstream and in the desorbate was determined by activational analysis, the details of which could be known to one skilled in the art.

During the adsorption of the feedstream in the silica gel bed zone 2, various cuts were taken at approximately 50 ml. intervals from conduit 3. These samples were then analyzed to determine the weight percent chlorine in the chloride-reduced stream (desorbate). The results of the analyses are indicated in Table II.

TABLE II

| Cut No. | Cut Vol., ml. | Wt. Percent Chlorine | |
|---|---|---|---|
| 1 | 50 | 10.2 | Some paraffins. |
| 2 | 50 | 15.1 | |
| 3 | 50 | 16.2 | |
| 4 | 50 | 16.9 | |
| 5 | 50 | 16.7 | |
| 6 | 50 | 17.2 | |
| 7 | 50 | 17.3 | |
| 8 | 50 | 16.8 | Monochlorides. |
| 9 | 50 | 16.9 | |
| 10 | 51 | 17.5 | |
| 11 | 49 | 16.9 | |
| 12 | 50 | 16.9 | |
| 13 | 49 | 17.2 | |
| 14 | 51 | 17.5 | |
| 15 | 50 | 17.6 | |
| 16 | 50 | 17.3 | |
| 17 | 29 | 18.1 [1] | |
| Feed | | 17.8 | |
| Desorbate | | 32.5 | Dichlorides. |

[1] Dichloride breakthrough.

These data indicate that until a "dichloride breakthrough" was noted on cut 17, substantially complete separation of monochlorides from dichlorides was obtained, the latter having been adsorbed in the silica gel bed.

Following the adsorption the dichlorides were desorbed from the silica gel bed and recovered from the desorbent fluid. This was done in a manner as hereinbefore described in connection with the description of the drawing.

EXAMPLE II

A feedstream containing $C_9$–$C_{13}$ n-paraffins, monochlorides and some dichlorides with a chlorine concentration of 4.4 weight percent was introduced through conduit 16 to silica gel bed zone 4. The conditions and the results of the adsorption step are shown in Table III.

TABLE III

Silica gel bed size—155.6 grams.
Feed quantity—300 ml.
Chlorine concentration in feed—4.4 wt. percent.
Feed rate approximately 1 LHSV.
Temperature—75–80° F.
Pressure—atmospheric.

| Cut No. | Cut Vol., ml. | Chlorine Concentration, Wt. percent |
|---|---|---|
| 1 | 50 | 0.009 |
| 2 | 50 | 1.2 |
| 3 | 50 | 3.9 |
| 4 | 70 | 4.2 |

Holdup=80 ml.

The low chlorine concentration in the first effluent from the bed shows that essentially all chlorides had been adsorbed. After cut No. 4, the loaded bed was washed with 100 ml. of n-pentane to remove non-adsorbed materials. The pentane was then purged out of the silica gel using nitrogen. Liquid carbon dioxide at 75° F. and 1000 p.s.i.g. was then introduced into the bed through conduit 10 and drained through conduit 11. This operation was repeated three times. The chloride product was recovered from the liquid $CO_2$ by flashing off the $CO_2$ in flash zone 12. The results of the recovery utilizing the liquid $CO_2$ are shown in Table IV.

TABLE IV

| | $CO_2$ Weight, gr. | Recovered Alkyl chloride, Wt. gr. |
|---|---|---|
| First Volume | 185.9 | 14.5 |
| Second Volume | 214.0 | 3.1 |
| Third Volume | 233.6 | 0.2 |
| Total | | 17.8 |

The chlorine content of the composite product was 24.5 weight percent. The product was thus a mixture of mono- and dichlorides and essentially free of n-paraffins.

Prior to the run indicated above, the silica gel bed zone had been used five times previously. The results obtained indicate the efficiency of the removal of adsorbed materials utilizing liquid $CO_2$.

Reasonable variation and modification are possible within the scope of the foregoing disclosure, the drawing and the appended claims to the invention, the essence of which is that there has been provided a method and apparatus for separation of halogen-substituted aliphatic compounds with an adsorption material, e.g., silica gel, and the desorption of said adsorbed halogen-substituted aliphatic compounds utilizing a desorbent, e.g., carbon dioxide.

I claim:

1. The method of separating monochlorinated paraffins from polychlorinated paraffins comprising contacting a mixture containing said monochlorinated paraffins which have from 9–14 carbon atoms per molecule and said polychlorinated paraffins which have from 9–14 carbon atoms per molecule with silica gel, whereby the polychlorinated paraffins are preferentially adsorbed, contacting said silica gel which has adsorbed said polychlorinated paraffins with liquid carbon dioxide to desorb said polychlorinated paraffins therefrom, and recovering the polychlorinated paraffins from the carbon dioxide.

2. The method of separating a mixture of monochlorinated paraffins, polychlorinated paraffins and unchlorinated paraffins comprising contacting a mixture containing said monochlorinated paraffins which have from 9–14 carbon atoms per molecule, said polychlorinated paraffins which have from 9–14 carbon atoms per molecule, and said unchlorinated paraffins with silica gel whereby said monochlorinated and polychlorinated paraffins are adsorbed, contacting said silica gel with liquid carbon dioxide to desorb said monochlorinated and said polychlorinated paraffins, recovering said monochlorinated and said polychlorinated paraffins from the carbon dioxide whereby a separated stream of chlorinated paraffins is formed, contacting said separated stream with silica gel whereby said polychlorinated paraffins are adsorbed, contacting said silica gel which has adsorbed said polychlorinated paraffins with liquid carbon dioxide to desorb said polychlorinated paraffins therefrom and recovering the polychlorinated paraffins from the carbon dioxide.

References Cited

UNITED STATES PATENTS

| 2,644,018 | 6/1953 | Harper | 260—676 XR |
| 2,712,986 | 7/1955 | Huckabay | 260—652 XR |
| 2,944,627 | 7/1960 | Skarstrom. | |
| 3,188,293 | 6/1965 | Bacon et al. | 252—411 |
| 3,267,162 | 6/1966 | Bohl | 260—662 XR |

LEON ZITVER, *Primary Examiner.*

H. T. MARS, *Assistant Examiner.*